United States Patent [19]

Okamoto et al.

[11] Patent Number: 4,574,154
[45] Date of Patent: Mar. 4, 1986

[54] TRIAZINE ADDITION COMPOUNDS

[75] Inventors: Hidemasa Okamoto; Mitsuo Yamanaka; Kazuyoshi Fujii, all of Hirakata, Japan

[73] Assignee: Ube Industries, Ltd., Ube, Japan

[21] Appl. No.: 566,195

[22] Filed: Dec. 28, 1983

[30] Foreign Application Priority Data

Dec. 28, 1982 [JP] Japan ................................. 57-227979
Apr. 7, 1983 [JP] Japan ................................. 58-59958

[51] Int. Cl.⁴ .......................................... C07D 403/14
[52] U.S. Cl. .................................... 544/192; 544/198; 252/609
[58] Field of Search ................................ 544/198, 192

[56] References Cited

FOREIGN PATENT DOCUMENTS 491992 4/1953 Canada ................................. 544/198
591460 1/1960 Canada ................................. 544/198

*Primary Examiner*—John M. Ford
*Attorney, Agent, or Firm*—Frishauf, Holtz, Goodman & Woodward

[57] ABSTRACT

A triazine addition compound consisting essentially of one mole of a triazine derivative having the formula (I):

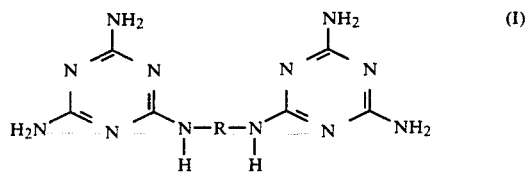

in which R is a divalent hydrocarbon residue containing 1–12 carbon atoms, and one or two moles of at least one compound selected from the group consisting of cyanuric acid and isocyanuric acid.

Processes of the preparation of the addition compound and a flame-retarded polyamide composition are also disclosed.

25 Claims, 4 Drawing Figures

TRIAZINE ADDITION COMPOUNDS

BACKGROUND OF THE INVENTION

1. Field of the Invention

This invention relates to a novel triazine addition compound, a flame-retarded polyamide composition containing the triazine addition compound, and a process for the preparation of the triazine addition compound. The novel triazine addition compound imparts an effective flame-retarding property to a polyamide without deteriorating appearance and properties of a molded product produced therefrom.

2. Description of Prior Arts

It has been heretofore known that melamine, cyanuric acid or isocyanuric acid can be incorporated into a polyamide to provide a flame-retarded polyamide, as disclosed, for instance, in Japanese Patent Publication No. 47(1972)-41745 and Japanese Patent Provisional Publication No. 51(1976)-39750. However, these known flame-retardants have drawbacks in that the retardant is liable to sublime staining the mold when a polyamide composition containing the retardant is molded, or the retardant is liable to bleed out on the surface of a molded product in the form of a fine powder in the course of actual employment of the molded product, for instance, due to absorption of moisture. These behaviors of the known flame-retardants unfavorably degrades appearance of the molded product. It is further known that cyanuric acid or isocyanuric acid imparts to polyamide higher flame-retarding effect than melamine does. However, cyanuric acid and isocyanuric acid have additional drawbacks in that these are easily decomposed in the molding process to bring about foamy portions (cavities) into the molded product.

Japanese Patent Provisional Publication No. 53(1978)-31759 discloses a flame-retarding melamine cyanurate, namely, a reaction product between equivalent moles of melamine and cyanuric acid, for eliminating the drawbacks of the known retardants such as melamine, cyanuric acid and isocyanuric acid. The melamine cyanurate is improved in the above-described drawbacks attached to the known melamine, cyanuric acid and isocyanuric acid retardant. However, the melamine cyanurate still has disadvantageous feature that the flame-retarding effect provided thereby is lower than that provided by simple melamine or cyanuric acid. For this reason, the melamine cyanurate is not satisfactorily employed as a flame-retardant used in manufacture of electric parts for which high flame-retarding effect is needed.

Japanese Patent Provisional Publication Nos. 53(1978)-47451, 56(1981)-22347, etc. disclose that melamine derivatives such as methylenedimelamine and ethylenedimelamine are employable as flame-retardants for polyamide which are free from the drawbacks attached to the melamine, cyanuric acid and isocyanuric acid. According to studies of the present inventors, however, the flame-retarding effects provided by these melamine derivatives are still unsatisfactory even though the effects are higher than that provided by the aforementioned melamine cyanurate.

SUMMARY OF THE INVENTION

A primary object of the present invention is to provide a novel compound which is specifically effective as a flame-retardant.

Another object of the invention is to provide a flame-retardant for polyamide.

A further object of the invention is to provide a flame-retarded polyamide composition practically free from staining and foaming caused by a flame-retardant included therein and further practically free from bleed-out of the flame-retardant.

A still further object of the invention is to provide a process for the preparation of the flame-retarding novel compound.

There is provided by the invention a triazine addition compound consisting essentially of one mole of a triazine derivative having the formula (I):

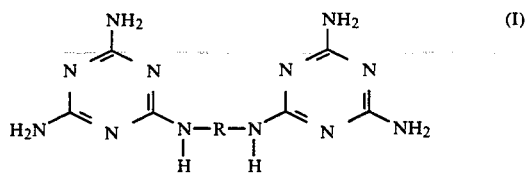

in which R is a divalent hydrocarbon residue containing 1-12 carbon atoms, and one or two moles of at least one compound selected from the group consisting of cyanuric acid and isocyanuric acid.

DETAILED DESCRIPTION OF THE INVENTION

Figure 1:
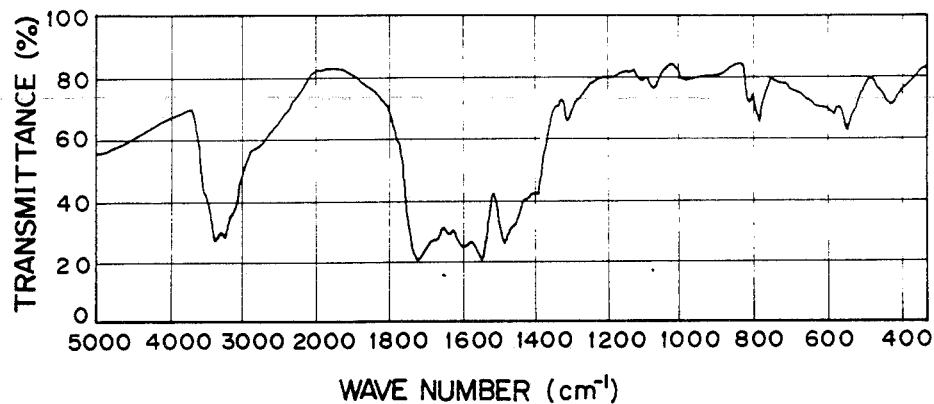
FIG. 1 is IR spectrum (KBr method) of the ethylenedimelamine-cyanuric acid (1:1) addition compound.

The novel triazine addition compound can be prepared by addition reaction between:

one mole of a triazine derivative having the formula (I):

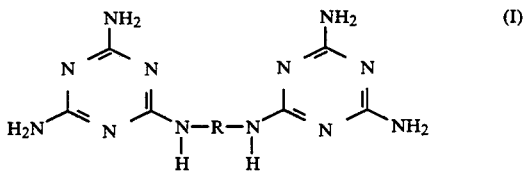

in which

R is a divalent hydrocarbon residue containing 1-12 carbon atoms, and one or two moles of at least one compound selected from the group consisting of cyanuric acid and isocyanuric acid.

In the addition reaction, cyanuric acid and/or isocyanuric acid can be introduced into the reaction mixture in excessive amounts. Still in that case, however, an addition product is a 1:1 molar ratio addition product, a 1:2 molar ratio addition product, or a mixture thereof.

The triazine derivative having the formula (I) is previously known, and the derivative as well as its preparation are disclosed in U.S. Pat. No. 2,544,071.

Examples of the triazine derivative having the formula (I) include methylenedimelamine (R=methylene), ethylenedimelamine (R=ethylene), trimethylenedimelamine (R=trimethylene), tetramethylenedimelamine (R=tetramethylene), hexamethylenedimelamine (R=hexamethylene), and dodecamethylenedimelamine (R=dodecamethylene).

Cyanuric acid and isocyanuric acid to be added to the triazine derivative have the following formulae (II) and (III), respectively.

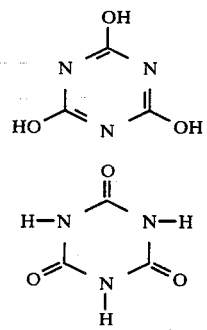

The cyanuric acid and isocyanuric acid are present as keto-enol tautomers relative to each other, and these are not present independently. For this reason, the cyanuric acid is hereinafter referred to as representing cyanuric acid and isocyanuric acid.

The triazine addition compound of the invention can be considered to be a kind of a salt between a weak basic triazine derivative of the formula (I) and a weak acidic cyanuric acid.

The triazine addition compound of the invention can be prepared by addition reaction between the triazine derivative of the formula (I) and cyanuric acid in a solvent capable of dissolving one or both reactants.

Examples of the solvent capable of dissolving both reactants include dimethylsulfoxide, diethylsulfoxide, N,N-dimethylformamide, N,N-dimethylacetamide, N-methyl-2-pyrrolidone, ethylene glycol, diethylene glycol, methylcellosolve, ethylcellosolve, dioxane, and water. These solvents can be employed singly or in combination with these solvents or other solvents.

The addition reaction can be advantageously carried out in an aqueous phase using the triazine derivative and cyanuric acid under heterogeneous conditions. For performing the heterogeneous reaction, 20–20,000 (preferably 50–10,000) parts by weight of water is generally employed per 100 parts by weight of a total amount of the triazine derivative and cyanuric acid.

The reaction is generally carried out under heating. There is no specific limitation on the reaction temperature, and generally the temperature is in the range from 0° to 300° C. A temperature higher than 300° C. is practically disadvantageous because the reactants are liable to decompose at such a high temperature. Preferable reaction temperature ranges from 50° to 200° C. The reaction is generally carried out at atmospheric pressure, but the reaction can be conducted under pressure or under reduced pressure, if desired. The reaction period generally ranges from 5 min. to 50 hrs, preferably from 1 to 30 hrs.

There is no limitation on the ratio between the triazine derivative and cyanuric acid introduced into a reaction mixture in carrying out the reaction. However, since the reaction product is the 1:1 or 1:2 addition product, the triazine derivative and cyanuric acid is preferably introduced in a ratio of 1:1 or 1:2 from an economical viewpoint.

In carrying out the above-mentioned heterogenous reaction, the triazine derivative and cyanuric acid both are preferably employed in powdery or granular forms having average size of not more than 500 $\mu$m, preferably not more than 200 $\mu$m. In the heterogeneous reaction, use of too small amount of water is not effective to accelerate the reaction rate, while use of an excessive amount of water is disadvantageous because recovery and drying of the product require a long period of time.

There is no limitation on procedure for mixing the reactants with water, but addition of the reactants in powder form to water are employed. The reaction smoothly proceeds in a slurry mixture to produce the desired triazine addition product. The recovery and purification of the product can be easily performed in known methods such as filtration, washing, etc.

The triazine addition compound of the present invention can be prepared using the triazine derivative in a form of a mono- or di-mineral acid salt and cyanuric acid in a form of an alkaline salt. Examples of the mineral acid include hydrochloric acid, sulfuric acid and nitric acid, and examples of the alkaline salt include alkali metal salts (e.g., monosodium salt and monopotassium salt), alkaline earth metal salts (e.g., calcium salt), and ammonium salt (e.g., monoammonium salt).

A representative IR spectrum of the triazine 1:1 addition compound (one mole of cyanuric acid per one mole of the triazine derivative) is given in FIG. 1 of the attached drawings. A representative IR spectrum of the triazine 1:2 addition compound (two moles of cyanuric acid per one mole of the triazine derivative) is given in FIG. 3. Both are white solids, decompose at temperatures higher than 300° C., and are sparingly soluble in such solvents as water, alcohols, ketones, dioxane and dimethylsulfoxide.

The novel triazine addition compound of the invention can be employed as an intermediate for preparing a pharmaceutically active compound or an agricultural chemical. Otherwise, the triazine addition compound can be employed singly or in combination with other compounds in a variety of arts, for instance, as a textile treating agent, an insecticide, a germicide, or a herbicide.

The triazine addition compound of the invention is of great value as a flame-retardant for thermoplastic resins, particularly for polyamide resin. The triazine addition compound is able to impart satisfactory flame-retarding characteristics to a thermoplastic resin even when added in a small amount. Further, this flame-retardant does not produce toxic gases upon thermal decomposition, and no bleed-out is observed in a molded resin product.

Among the triazine addition compounds of the invention having the formula (I), those in which R are divalent hydrocarbon residues containing 1–6 carbon atoms are preferred. More preferred is one in which R is ethylene group.

The triazine addition compound of the invention is of particularly great value as a flame-retardant for polyamide, because it shows the above-described advantageous properties as compared with the known flame-retardants. More in detail, a polyamide composition containing as flame-retardant the triazine addition compound of the invention shows the advantageous features described below:

(1) a high flame-retarding effect is obtained with even in a small amount of the flame retardant;

(2) the favorable properties inherently attached to polyamide are little affected by the flame-retardant because relatively a small amount of the retardant is required;

(3) substantially no stain is imparted to the mold in the molding process;

(4) substantially no foaming takes place in the molding process; and (5) substantially no bleed-out of the retardant takes place.

Examples of the polyamide include polylactams such as nylon 6, nylon 11 and nylon 12, polyamides produced from dicarboxylic acid and diamine such as nylon 66, nylon 610 and nylon 612; copolymeric polyamides such as nylon 6/66 and nylon 6/66/610, and their mixtures.

The amount of the triazine addition compound of the invention introduced into polyamide ranges from 1 to 65 parts by weight, preferably from 1 to 40 parts by weight, based on 100 parts by weight of the polyamide.

The flame-retarded polyamide composition provided by the present invention may further contain known additives such as an anti-oxidant, a lubricant, an inorganic filler, etc.

The present invention is further described by the following examples.

EXAMPLE 1

An ethylenedimelamine solution was prepared by heating to 100° C. a mixture of 13.9 g. (0.05 mole) of ethylenedimelamine and 600 ml. of dimethylsulfoxide. Independently, a cyanuric acid solution was prepared by heating to 100° C. a mixture of 6.45 g. (0.05 mole) of cyanuric acid and 100 ml. of dimethylsulfoxide.

The cyanuric acid solution at 100° C. was added to the ethylenedimelamine solution kept at 100° C., instantly producing white precipitate. The reaction mixture was filtered in hot state. The collected precipitate was washed sufficiently with hot dimethylsulfoxide and subsequently washed with great amounts of hot water and acetone. The precipitate was dried to obtain 18.5 g. of a white powdery product.

The analytical data and other properties of the product are set forth below:

Analysis for $C_8N_{12}H_{14} \cdot C_3N_3H_3O_3$: Found (%): C 32.37%, H 4.20%, N 51.55%; Calculated (%): C 32.43%, H 4.18%, N 51.60%;

Melting point: decomposed at 330° C. (TGA method);

Solubility (at room temperature): sparingly soluble in water, alcohols, ketones, dioxane and dimethylsulfoxide;

IR spectrum: FIG. 1 (KBr method), for reference IR spectrum of a 1:1 mixture of ethylenedimelamine and cyanuric acid is given in FIG. 2 (KBr method).

Figure 2:
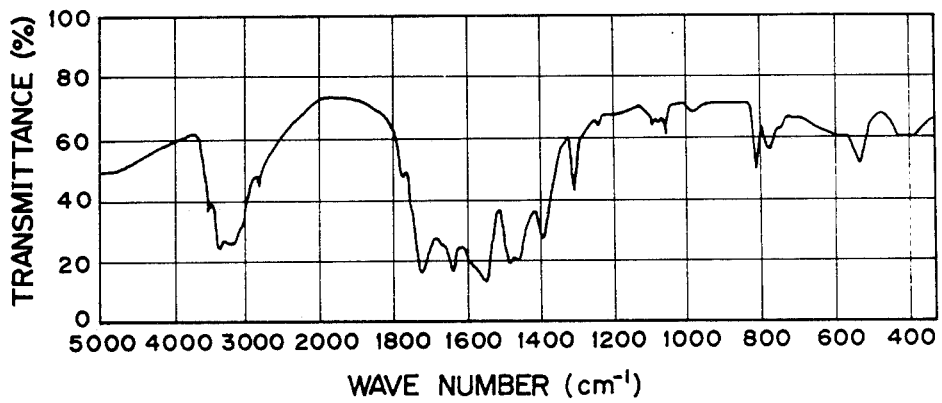
FIG. 2 is IR spectrum (KBr method) of a 1:1 mixture of ethylenedimelamine and cyanuric acid.

IR spectrum of FIG. 1 is apparently different from IR spectrum of FIG. 2 (simple mixture). It is noted that IR spectrum of FIG. 1 shows absorption peaks at 2750-2800 cm$^{-1}$ and 1600 cm$^{-1}$ which are characteristic peaks of an ammonium salt.

Based on the above-described results, the obtained product was identified as ethylenedimelamine-cyanuric acid 1:1 molar ratio addition compound.

EXAMPLE 2

The procedure of Example 1 was repeated except that the amount of cyanuric acid was changed to 12.9 g. (0.1 mole). There was obtained 25.2 g. of a white powdery product.

Figure 3:
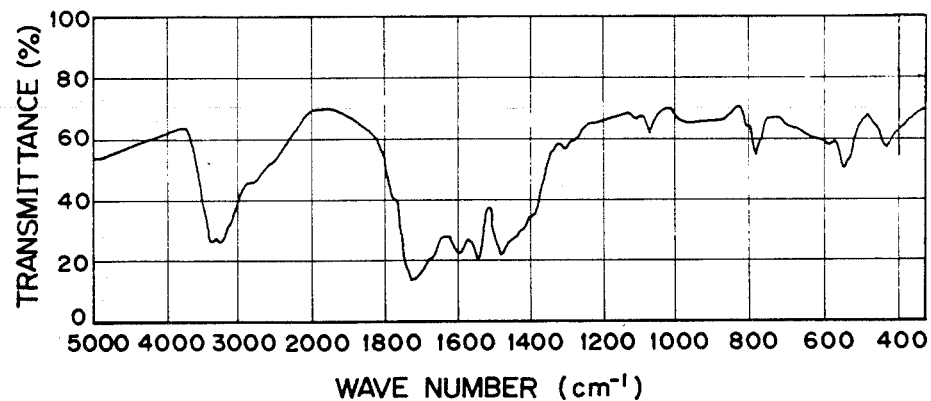
FIG. 3 is IR spectrum (KBr method) of the ethylenedimelamine-cyanuric acid (1:2) addition compound.

The analytical data and other properties of the product are set forth below:

Analysis for $C_8N_{12}H_{14} \cdot 2C_3N_3H_3O_3$: Found (%): C 31.31%, H 3.71%, N 46.95%; Calculated (%): C 31.34%, H 3.73%, N 47.01%;

Melting point: decomposed at 340° C. (TGA method);

Solubility (at room temperature): sparingly soluble in water, alcohols, ketones, dioxane and dimethylsulfoxide;

IR spectrum: FIG. 3 (KBr method), for reference IR spectrum of a 1:2 mixture of ethylenedimelamine and cyanuric acid is given in FIG. 4 (KBr method).

Figure 4:
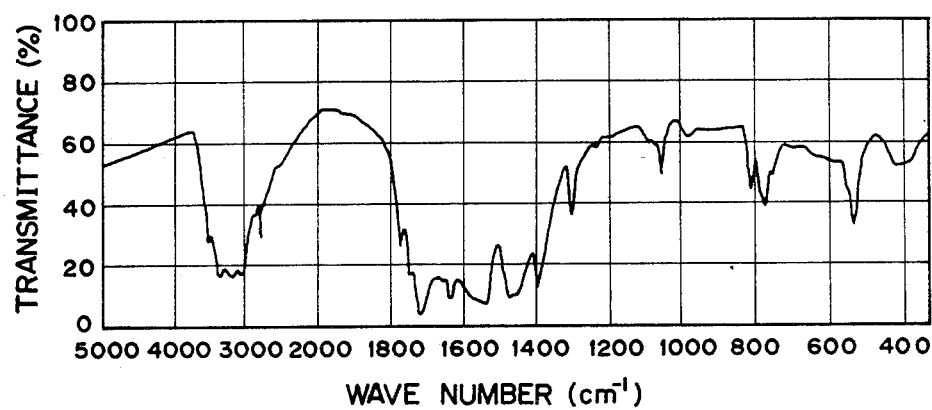
FIG. 4 is IR spectrum (KBr method) of a 1:2 mixture of ethylenedimelamine and cyanuric acid.

IR spectrum of FIG. 3 is apparently different from IR spectrum of FIG. 4 (simple mixture). It is noted that IR spectrum of FIG. 3 shows absorption peaks at 2750-2800 cm$^{-1}$ and 1600 cm$^{-1}$ which are characteristic peaks of an ammonium salt.

Based on the above-described results, the obtained product was identified as ethylenedimelamine-cyanuric acid 1:2 molar ratio addition compound.

EXAMPLE 3

The procedure of Example 1 was repeated except that the amount of cyanuric acid was changed to 25.8 g. (0.2 mole). There was obtained 25.4 g. of a white powdery product.

The analytical data and other properties of the product are set forth below:

Analysis for $C_8N_{12}H_{14} \cdot 2C_3N_3H_3O_3$: Found (%): C 31.30%, H 3.75%, N 47.03%; Calculated (%): C 31.34%, H 3.73%, N 47.01%;

Melting point: decomposed at 340° C. (TGA method);

Solubility (at room temperature): sparingly soluble in water, alcohols, ketones, dioxiane and dimethylsulfoxide;

IR spectrum: same as FIG. 3.

Based on the above-described results, the obtained product was identified as ethylenedimelamine-cyanuric acid 1:2 molar ratio addition compound.

EXAMPLE 4

The procedure of Example 2 was repeated except that ethylenedimelamine was replaced with hexamethylenedimelamine (16.7 g., 0.05 mole). There was obtained 26.7 g. of a white powdery product.

The analytical data and other properties of the product are set forth below:

Analysis for $C_{12}N_{12}H_{22} \cdot 2C_3N_3H_3O_3$: Found (%): C 36.40%, H 4.75%, N 42.51%; Calculated (%): C 36.49%, H 4.73%, N 42.57%;

Melting point: decomposed at 320° C. (TGA method);

Solubility (at room temperature): sparingly soluble in water, alcohols, ketones, dioxane and dimethylsulfoxide;

IR spectrum: similar to FIG. 3 having absorption peaks at 2750-2800 cm$^{-1}$ and 1600 cm$^{-1}$ which are characteristic peaks of an ammonium salt.

Based on the above-described results, the obtained product was identified as hexamethylenedimelamine-cyanuric acid 1:2 molar ratio addition compound.

EXAMPLE 5

The procedure of Example 2 was repeated except that ethylenedimelamine was replaced with dodecamethylenedimelamine (20.9 g., 0.05 mole). There was obtained 31.1 g. of a white powdery product.

The analytical data and other properties of the product are set forth below:

Analysis for $C_{18}N_{12}H_{34}.2C_3N_3H_3O_3$: Found (%): C 42.56%, H 5.89%, N 37.30%; Calculated (%): C 42.60%, H 5.92%, N 37.28%;

Melting point: decomposed at 315° C. (TGA method);

Solubility (at room temperature): sparingly soluble in water, alcohols, ketones, dioxane and dimethylsulfoxide;

IR spectrum: similar to FIG. 3 having absorption peaks at 2750-2800 $cm^{-1}$ and 1600 $cm^{-1}$ which are characteristic peaks of an ammonium salt.

Based on the above-described results, the obtained product was identified as dodecamethylenedimelamine-cyanuric acid 1:2 molar ratio addition compound.

EXAMPLES 6-7

94 parts by weight of nylon 6 pellets (number-average molecular weight: 13,000) were blended with 6 parts by weights of the ethylenedimelamine-cyanuric acid 1:1 or 1:2 molar ratio addition compound. The mixture was processed through an extruder to obtain pellets. Thus obtained pellets were then processed through an injection machine at 230° C. to prepare a specimen for flammability test.

Independently, 94 parts by weight of the above-mentioned nylon 6 pellets were blended with 6 parts by weights of the ethylenedimelamine-cyanuric acid 1:1 or 1:2 molar ratio addition compound and 0.5 part by weight of carbon black. The mixture was processed through an extruder to obtain pellets. Thus obtained pellets were then processed through an injection machine at 230° C. to prepare a specimen for bleed-out test.

COMPARISON EXAMPLES 1-2

The processes for the preparation of the specimens described in Examples 6-7 were repeated except that the ethylenedimelamine-cyanuric acid 1:1 or 1:2 molar ratio addition compound was replaced with ethylenedimelamine or cyanuric acid in the same amount. Thus, specimens for flammability test and bleed-out test were prepared.

FLAMMABILITY TEST AND BLEED-OUT TEST

The flammability of the specimens and the bleed-out of the flame-retardants were evaluated as follows.

(1) Flammability test

The flammability test was performed in accordance with Subject 94 (UL-94, defined by Underwriters-Laboratories Inc., USA) using a specimen of 5 in. (length)×½ in. (width)×1/32 in. (thickness).

(2) Bleed-out test

A specimen for bleed-out test (80 mm×80 mm×2 mm) was allowed to stand for ten days in air at 95% RH and 40° C. After that, the surface of the specimen was observed by naked eyes.

The results are set forth in Table 1.

TABLE 1

| | Flame-retardant | Flammability (UL-94) | Bleed-out |
|---|---|---|---|
| Example | | | |
| 6 | 1:1 Addition compound | V-0 | None |
| 7 | 1:2 Addition compound | V-0 | None |
| Com. Example | | | |
| 1 | Ethylenedimelamine | V-2 | None |
| 2 | Cyanuric acid | — | — |

Remark: The specimen of Comparative Example 2 containing cyanuric acid as the flame-retardant showed noticeable foaming.

EXAMPLE 8

To 800 ml. of water were added 27.8 g. (0.1 mole) of powdery ethylenedimelamine (average size: 6 μm) and 12.9 g. (0.1 mole) of cyanuric acid (average size: 100 μm). The reaction was carried out under stirring at 100° C. for 10 hrs. in the heterogeneous aqueous phase in which both reactants were suspended in water.

After the reaction was complete, the reaction mixture was filtered in hot state. The filtration was complete within 3 min. The collected precipitate was washed sufficiently with hot water. The precipitate was dried at 80° C. to obtain 40.2 g. of a white powdery product.

The analytical data and other properties of the product were identical to the product of Example 1.

EXAMPLE 9

The procedure of Example 8 was repeated except that the amount of cyanuric acid was changed to 25.8 g. (0.2 mole). There was obtained 53.1 g. of a white powdery product.

The analytical data and other properties of the product were identical to the product of Example 2.

EXAMPLE 10

The procedure of Example 9 was repeated except that ethylenedimelamine was replaced with hexamethylenedimelamine (average size: 7 μm) in an amount of 33.4 g. (0.1 mole). There was obtained 58.5 g. of a white powdery product.

The analytical data and other properties of the product were identical to the product of Example 4.

EXAMPLE 11

The procedure of Example 9 was repeated except that ethylenedimelamine was replaced with dodecamethylenedimelamine (average size: 6 μm) in an amount of 41.8 g. (0.1 mole). There was obtained 66.2 g. of a white powdery product.

The analytical data and other properties of the product were identical to the product of Example 5.

EXAMPLE 12

The procedure of Example 9 was repeated except that the amount of water and reaction time were changed to 200 ml. and 15 hrs., respectively. There was obtained 53.0 g. of a white powdery product.

The analytical data and other properties of the product were identical to the product of Example 2.

EXAMPLE 13

In a 1-l. autoclave equipped with a stirrer were placed 27.8 g. (0.1 mole) of powdery ethylenedimelamine (average size: 30 μm), 25.8 g. (0.2 mole) of cyanuric acid (average size: 100 μm), and 500 ml. of water. The reaction was carried out therein under stirring at 130° C. for 10 hrs. in the heterogeneous aqueous phase in which both reactants were suspended in water. The aqueous vapor pressure in the autoclave was 2.6 kg/cm².

After the reaction was complete, the reaction mixture was processed in the same manner as in Example 9. There was obtained 53.2 g. of a white powdery product.

The analytical data and other properties of the product were identical to the product of Example 2.

We claim:

1. A triazine addition compound consisting essentially of one mole of a triazine derivative having the formula (I):

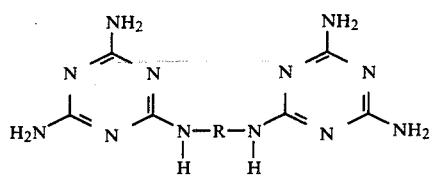

in which R is a divalent hydrocarbon residue containing 1–12 carbon atoms,
and one or two moles of one or two compounds selected from the group consisting of cyanuric acid and isocyanuric acid.

2. The triazine addition compound as claimed in claim 1, in which R of the formula (I) is a divalent hydrocarbon residue containing 1–6 carbon atoms.

3. The triazine addition compound as claimed in claim 1, wherein R of the formula (I) is a divalent hydrocarbon residue selected from the group consisting of methylene, ethylene, tremethylene, tetramethylene, hexamethylene and dodecamethylene.

4. The triazine addition compound as claimed in claim 3, wherein R is methylene.

5. The triazine addition compound as claimed in claim 3, wherein R is ethylene.

6. The triazine addition compound as claimed in claim 3, wherein R is trimethylene.

7. The triazine addition compound as claimed in claim 3, wherein R is tetramethylene.

8. The triazine addition compound as claimed in claim 3, wherein R is hexamethylene.

9. The triazine addition compound as claimed in claim 1, wherein said triazine addition compound consists essentially of said triazine derivative and cyanuric acid.

10. The triazine addition compound as claimed in claim 2, wherein said triazine addition compound consists essentially of said triazine derivative and cyanuric acid.

11. The triazine addition compound as claimed in claim 3, wherein said triazine addition compound consists essentially of said triazine derivative and cyanuric acid.

12. The triazine addition compound as claimed in claim 4, wherein said triazine addition compound consists essentially of said triazine derivative and cyanuric acid.

13. The triazine addition compound as claimed in claim 5, wherein said triazine addition compound consists essentially of said triazine derivative and cyanuric acid.

14. The triazine addition compound as claimed in claim 6, wherein said triazine addition compound consists essentially of said triazine derivative and cyanuric acid.

15. The triazine addition compound as claimed in claim 7, wherein said triazine addition compound consists essentially of said triazine derivative and cyanuric acid.

16. The triazine addition compound as claimed in claim 8, wherein said triazine addition compound consists essentially of said triazine derivative and cyanuric acid.

17. The triazine addition compound as claimed in claim 1, wherein said triazine addition compound consists essentially of said triazine derivative and isocyanuric acid.

18. The triazine addition compound as claimed in claim 5, wherein said triazine addition compound consists essentially of said triazine derivative and isocyanuric acid.

19. A process for the preparation of a triazine addition compound consisting essentially of one mole of a triazine derivative having the formula (I):

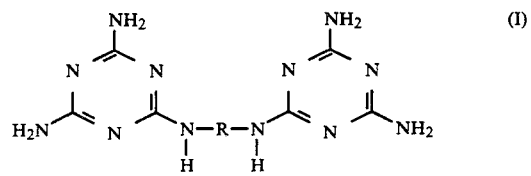

in which R is a divalent hydrocarbon residue containing 1–12 carbon atoms,
and one or two moles of at least one cyanuric compound selected from the group consisting of cyanuric acid and isocyanuric acid,
which comprises reacting the triazine derivative and said cyanuric compound in an aqueous phase under heterogeneous conditions in the presence of 20–20,000 parts by weight of water per 100 parts by weight of the total amount of the triazine derivative and said cyanuric compound.

20. The process of claim 19, in which the water is in an amount of 50–10,000 parts by weight based on 100 parts of the total amount of the triazine derivative and said cyanuric compound.

21. The process of claim 20, wherein said aqueous phase also contains at least one solvent selected from the group consisting of dimethylsulfoxide, diethylsulfoxide, N,N-dimethylformamide, N-N-dimethylacetamide, N-methyl-2-pyrrolidone, ethylene glycol, diethylene glycol, methylcellosolve, ethylcellosolve and dioxane.

22. The process of claim 21, wherein said reaction is carried out at a temperature of from 50° to 200° C.

23. The process of claim 22, wherein said solvent is dimethylsulfoxide.

24. The process of claim 19, wherein said aqueous phase also contains dimethylsulfoxide.

25. The process of claim 19, wherein said aqueous phase also contains at least one solvent selected from the group consisting of dimethylsulfoxide, diethylsulfoxide, N,N-dimethylformamide, N-N-dimethylacetamide, N-methyl-2-pyrrolidone, ethylene glycol, diethylene glycol, methylcellosolve, ethylcellosolve and dioxane.

* * * * *